United States Patent [19]

Arnold

[11] Patent Number: 4,808,305

[45] Date of Patent: Feb. 28, 1989

[54] APPARATUS FOR SLUDGE POND TREATMENT

[76] Inventor: James D. Arnold, P.O. Box 5403, Beaumont, Tex. 77702

[21] Appl. No.: 916,876

[22] Filed: Oct. 9, 1986

[51] Int. Cl.⁴ .............................. C02F 1/52; B01F 3/12
[52] U.S. Cl. .................................. 210/170; 210/198.1; 210/242.1; 37/66; 239/533.13; 239/229
[58] Field of Search ..................... 210/197, 198.1, 714, 210/715, 710, 712, , 747, 768, 170, 206, 208, 219, 242.1; 137/846, 844; 37/66; 239/229, 533.13, 533.15

[56] References Cited

U.S. PATENT DOCUMENTS

| | | | |
|---|---|---|---|
| 15,192 | 6/1856 | Peale | 137/844 |
| 2,758,874 | 8/1956 | Snyder | 239/229 |
| 3,282,513 | 11/1966 | Savage | 239/533.13 |
| 3,465,595 | 9/1969 | Tansony | 137/846 |
| 4,043,909 | 8/1977 | Endo et al. | 210/170 |
| 4,104,813 | 8/1978 | Lindsey | 37/66 |
| 4,217,212 | 8/1980 | Deal | 37/66 |
| 4,347,140 | 8/1982 | Condolios et al. | 210/747 |

Primary Examiner—Benoit Castel
Attorney, Agent, or Firm—Bernard A. Reiter

[57] ABSTRACT

Disclosed is a mixing valve for use in sludge treatment and solidification of sludge ponds. The valve has a main body into which the sludge suspension is pumped. Located within the main body of the valve is a flexible hose through which the sludge treating and solidification agents such as lime, cement, quicklime and sand is delivered pneumatically into the main body of the valve. The turbulence created by the discharge of air and solids into the sludge suspension causes the component to mix thoroughly with one another. Mixing is enhanced by allowing the open end of the flexible hose to be free. Thus, when blowing in the treating and solidification agents, the free end of the hose is allowed to flap within the main body of the valve thereby enhancing turbulence and mixing. The hose is flexible enough so that if pneumatic pressure is lost, the pressure of the sludge suspension within the main body and about the flexible hose will cause the flexible hose to collapse on itself thereby preventing the backflow of the sludge through the hose and into the container in which the sludge treating and solification agents are stored.

3 Claims, 1 Drawing Sheet

APPARATUS FOR SLUDGE POND TREATMENT

FIELD OF THE INVENTION

This invention relates generally to sludge pond treatment systems and more particularly to the introduction and mixing of drying and solidification agents into the sludge.

BACKGROUND OF THE INVENTION

Sludge ponds contaminated with a variety of chemicals is a common problem faced by many industries. Clean up and control of such sludge ponds are subject to the regulations of the EPA. Typically, the treatment of a sludge is performed in a batch-type operation whereby quantities of the sludge are removed from the pond to a treating facility for some type of processing.

The combination mixing and check valve of the present invention allows for the in situ and continuous treatment of a sludge pond. The net result is a time and cost effective treatment for sludge ponds enabled by a valve which turbulently intermixes the powdered and/or granular treating agents with the liquid-sludge suspension.

SUMMARY OF THE INVENTION

It is therefore an object of the present invention to provide a device for introducing drying and solidifying agents into a sludge slurry.

It is a further object of the present invention to provide a device which mixes drying and solidifying agents with a sludge slurry.

Yet another object of the present invention is to provide a device which introduces and mixes solids into a sludge slurry.

A further object is to solidify a sludge pond in-situ.

A further object of the present invention is to provide a valve which induces the turbulent intermixing of individual streams of solids and liquids pumped through it.

A further object of the present invention is to provide a valve through which solids and liquids can be introduced and mixed.

Still a further object of the present invention is to provide a mixing valve for mixing solids with liquids whereby back flow of liquid into the solids line is prevented.

Briefly stated, the foregoing and numerous other objects and advantages of the present invention are accomplished by creating a combination valve and mixer in the discharge line of a sludge handling pump. A sludge handling pump is mounted on a deck barge such that it takes suction at or near the bottom of a sludge pond. Augers are provided to churn up the sludge and sediment at the bottom of the pond immediately adjacent the sludge handling pump to insure that the sludge handling pump picks up the solids and sediment from the base of the pond. The sludge handling pump transmits the pond sludge and liquid through a discharge line which discharges the intermixed sludge pond sediment and liquid back into the pond below the surface of the pond. Connected to and entering into the discharge line is a flexible conduit for the introduction of solids, drying agents and solidifying agents. These materials include lime, fly ash, flue dust, portland cement, quicklime and sand. The flexible conduit is of substantially smaller diameter than the discharge conduit. The materials mentioned above are transmitted through the flexible conduit pneumatically when the sludge handling pump is pumping the contents of the sludge pond. In such manner, the contents of the sludge pond are intermixed with one or more of the above-mentioned materials to effect solidification of the sludge pond mass. Mixing is accomplished through the turbulence within the discharge piping as well as the movement of the flexible conduit within the discharge piping. Because the flexible conduit is flexible, the transmission of solids pneumatically through it will tend to cause the flexible conduit to have a flapping action thus enhancing the turbulence within the discharge pipe.

Should pneumatic pressure be lost in the flexible conduit, it is imperative that sludge pond liquid be prevented from backflowing into the flexible conduit. This situation is prevented by making sure that the flexible conduit is flexible enough such that it will collapse on itself due to the pressure within the discharge pipe when the sludge handling pump is in operation and pneumatic pressure to the flexible conduit is lost. Thus, the flexibility of the solids delivery conduit creates two significant advantages. There is first the mechanical agitation supplied by the flapping action of the conduit and secondly, there is the prevention of backflowing of sludge pond liquid into the solids handling circuit if pneumatic pressure is lost.

DESCRIPTION OF THE PREFERRED EMBODIMENT

Figures 1, 2:
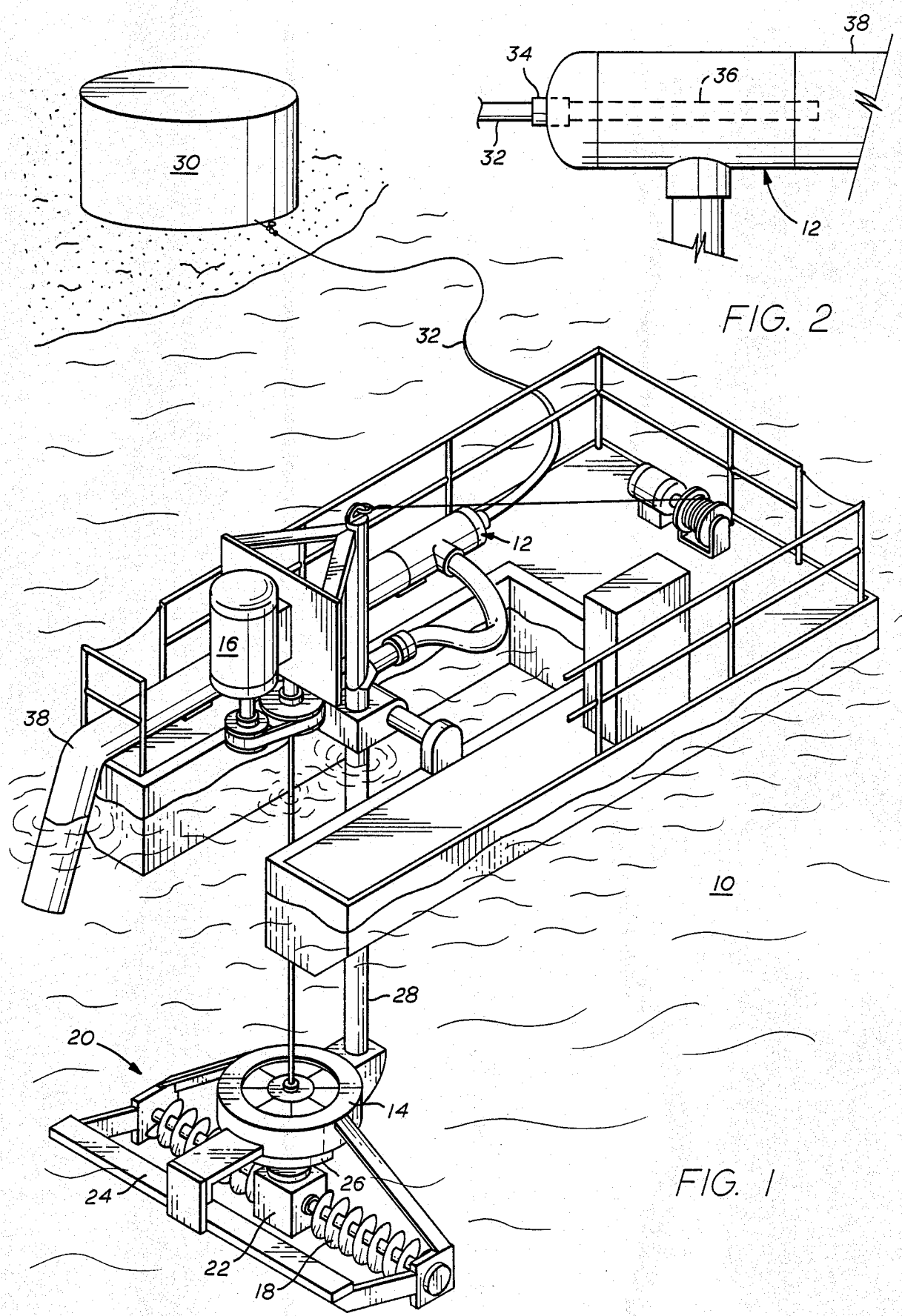
FIG. 1 is a perspective view of a sludge pumping barge having the mixing valve of the present invention incorporated therein.
FIG. 2 is a sectional view of the mixing valve of the present invention.

Turning first to FIG. 1 there is shown a sludge handling barge 10 having incorporated therein the mixing valve device 12 of the present invention. The sludge handling barge 10 has pivotally mounted thereto and extending downward therefrom a sludge handling pump 14 which is driven by motor 16. The mixing valve device 12 is located in the discharge piping of sludge handling pump 14. Also mounted to the barge 10 are augers 18 and 20 connected to gear box 22 and supported by frame 24. Augers 18 and 20 extend horizontally outward from sludge handling pump 14 in close proximity to sludge handling pump 14. In such manner, augers 18 and 20 are used to deliver sludge pond sediments and solids to the suction port 26 of the sludge handling pump 14. It should be recognized that augers 18 and 20 could be replaced with any mechanical agitation means suitable for churning up sludge pond sediment.

Sludge handling pump 14 discharges through conduit 28 into mixing valve 12. Drying agents, solidifying agents and other solids are delivered from a stationary storage source 30 through conduit 32 to mixing valve 12. The delivery system is preferably pneumatic and conduit 32 is preferably flexible to allow barge 10 freedom of movement within the pond. Conduit 32 ties into mixing valve 12 at nipple 34. Nipple 34 extends inward into mixing valve 12 such that there is connected thereto flexible hose 36. Connected to mixing valve 12 is intermixed discharge line 38 which extends beyond barge 10 and turns downward such that discharge is below the surface of the pond.

The mixing valve of the present invention can handle solids in amounts up to 30% by weight of sludge slurry being pumped therethrough. As the barge is moved across the pond, sludge is extracted from the bottom of the pond via sludge handling pump 14 and introduced into the mixing valve 12 where it is thoroughly mixed with the drying agents, solidifying agents and other solids being delivered from stationary storage source 30 through conduit 32. The mixing valve 12 may be likened to a venturi in arrangement. However, mixing is even more complete due to the great amount of turbulence created by the pneumatic delivery system and the flapping action of flexible hose 36 within the mixing valve 12.

Should pneumatic pressure be lost in conduit 32, it is imperative that sludge liquid not be allowed to backflow through conduit 32. Therefore, mixing valve 12 must also serve as a check valve for conduit 32. The flexibility of hose 36 allows mixing valve 12 to serve just such a purpose. Should pneumatic pressure be lost in conduit 32, the pressure within mixing valve 12 supplied by the discharge from sludge handling pump 14 would cause flexible hose 36 to collapse on itself thus preventing any liquid from flowing therethrough and back into conduit 32.

In operation, a continuous blending of sludge pond liquid, sludge pond solids and drying and solidifying agents is accomplished in-situ, that is without removal of sludge itself from the pond. This procedure is maintained until the prescribed amounts of additives have been injected and mixed into the material being treated. Once this has been accomplished, the sludge pond material is allowed to solidify for a prescribed time. The materials so treated are thus easier to handle, dispose of and test for toxicity. The resultant solidified mass is homogeneous in nature. It should be recognized that the mixing of this homogeneous mass has been accomplished in a completely enclosed mixing valve with suction and discharge both being below the surface of the pond such that there are no dust admissions to the atmosphere. Therefore, the apparatus and method manifests a marked cost improvement over other competing methods and devices. Further, the apparatus and method of the present invention prevents the emission of dust to the atmosphere as is typical of competing methods and devices.

From the foregoing, it will be seen that this invention is one well adapted to attain all of the ends and objects hereinabove set forth, together with other advantages which are obvious and which are inherent to the device.

It is to be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A valve for intermixing solids and liquids comprising:
   (a) a main body having a liquid inlet port and an outlet port;
   (b) a solids inlet port through which solids can be introduced into said main body;
   (c) an elongated flexible hose having a proximal end and a distal end, said proximal end being affixed to said solids inlet port, said elongated flexible hose being contained within said main body, said distal end of said elongated flexible hose being free so that when the solids and liquids are transmitted into said main body, said distal end moves randomly thereby enhancing mixing, said flexible hose being flexible enough to collapse on itself due to the pressure of the liquid within said main body when pressure is lost within said flexible hose so that the liquid is prevented from backflowing through said solids inlet port.

2. A valve for intermixing powdered and granular solids with liquids and suspensions comprising:
   (a) a main body;
   (b) a liquid and suspension inlet port in said main body;
   (c) an outlet port in said main body;
   (d) a powdered and granular solids inlet port in said main body;
   (e) an elongated flexible hose member having proximal and distal ends, said proximal end being affixed to said powdered and granular solids inlet port and said distal end being free; so that during intermixing of the solids and the liquids, said elongated flexible hose member is allowed to move randomly within said main body thereby providing mechanical agitation, said elongated flexible hose member being flexible enough to collapse upon itself under the pressure of the liquid within said main body when powdered and granular solids are not being transmitted through said elongated flexible hose member thereby preventing the liquids and suspensions from backflowing through said solids inlet port.
   (f) a discharge conduit extending from said outlet port, said elongated flexible hose member contained entirely within said main body and said discharge conduit.

3. An apparatus for in situ treatment of sludge ponds including the liquid and sediment therein comprising:
   (a) a barge;
   (b) a sludge pump extending downward from said barge so that said sledge pump interacts with the sludge pond liquid and sediment;
   (c) an auger located proximately to said sludge pump to direct the sediment toward said sludge pump;
   (d) a discharge line through which said sludge pump conducts the sludge pond liquid and sediment back into the sludge pond;
   (e) a mixing valve in said discharge line, said mixing valve receiving sludge treating and solidification agents through a first flexible conduit attached to said mixing valve;
   (f) a second flexible conduit having proximal and distal ends, said second flexible conduit receiving flow from said first flexible conduit at said proximal end, said distal end being free, said second flexible conduit being contained within said mixing valve and said discharge line; so that when the sludge treating and solidification agents are transmitted through said second flexible conduit, said distal end of said second flexible conduit is allowed to move randomly thereby enhancing mixing of the sludge pond liquid and sediment with the sludge treating and solidification agents, said second flexible conduit being flexible enough to collapse upon itself when the sludge treating and solidification agents are not being transmitted therethrough, thereby preventing the sludge pond liquid and sediment from backflowing through said first flexible conduit.

* * * * *